Patented Dec. 27, 1938

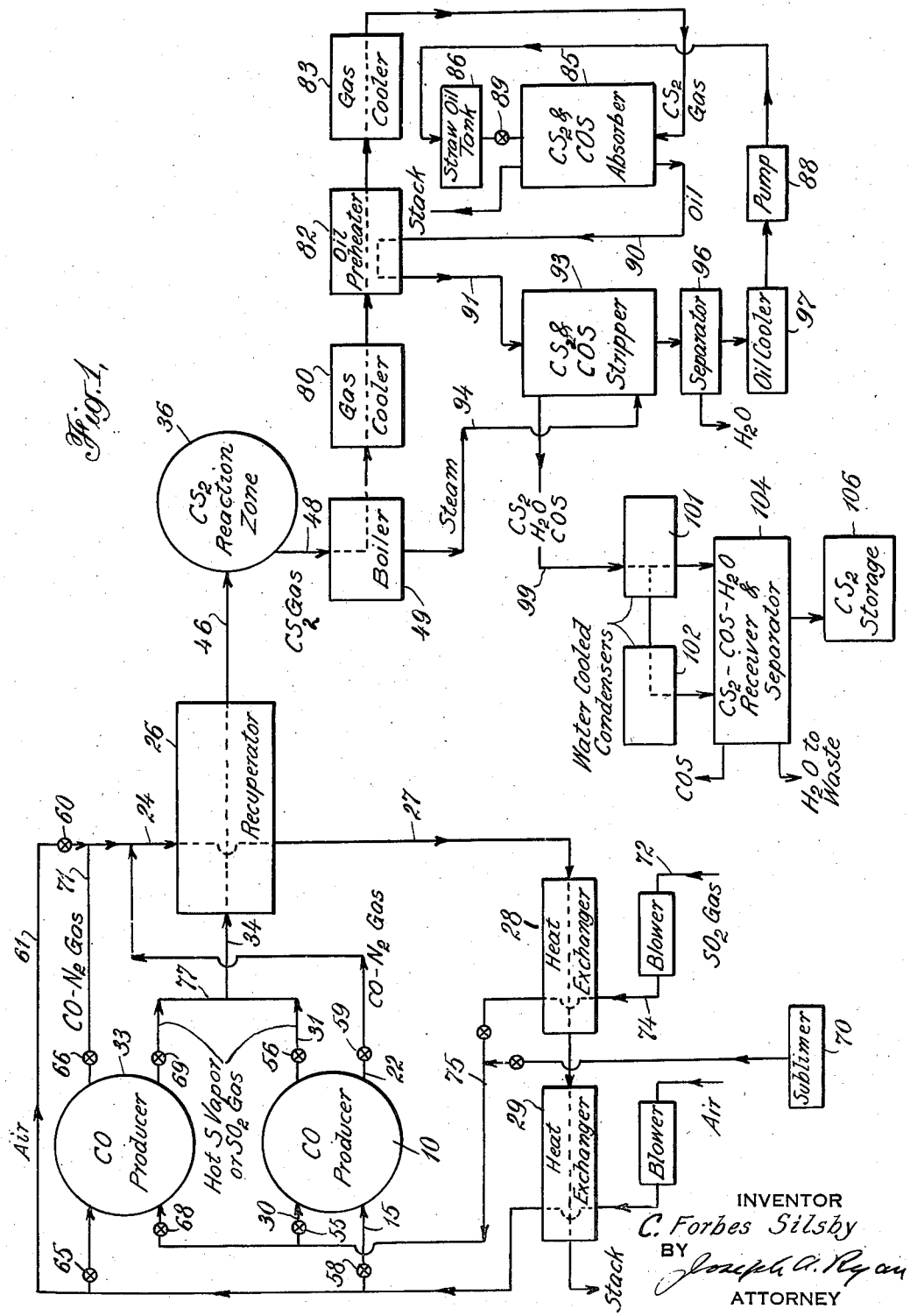

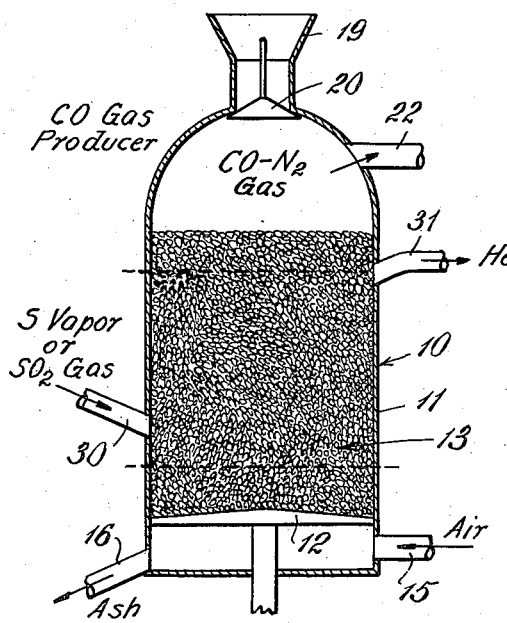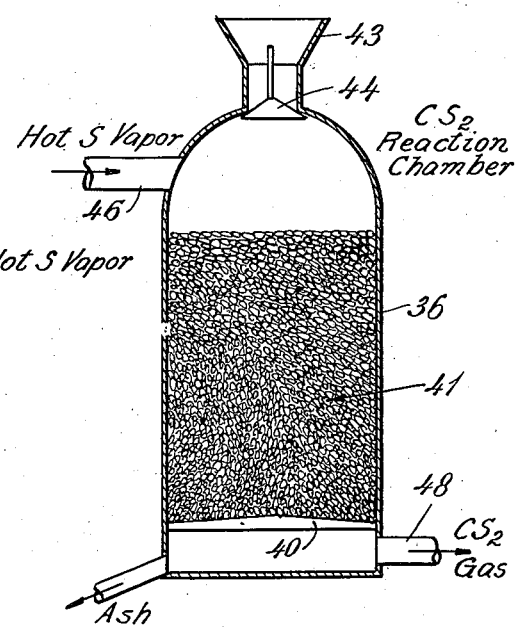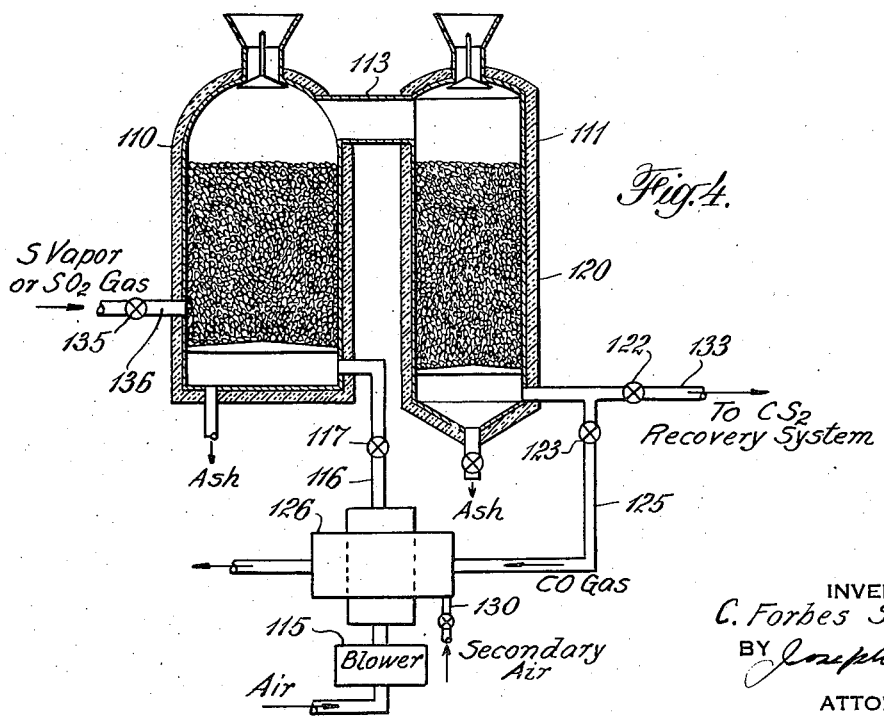

2,141,766

UNITED STATES PATENT OFFICE 2,141,766

MANUFACTURE OF CARBON BISULPHIDE

Charles Forbes Silsby, White Plains, N. Y., assignor to General Chemical Company, New York, N. Y., a corporation of New York Application October 20, 1937, Serial No. 169,968

11 Claims. (Cl. 23—206)

This invention relates to the manufacture of carbon bisulphide and is more particularly directed to production of carbon bisulphide by reacting sulphur in the form of vapor or sulphur dioxide with solid carbonaceous material.

Production of carbon bisulphide by reacting sulphur in the form of vapor or sulphur dioxide gas with carbon has been proposed. In commercial practice, however, only certain types of solid carbonaceous material may be used because, as is well known in the art, all forms of carbon are not sufficiently active to combine economically with sulphur. Metallurgical coke is an example of an insufficiently active form of carbon. The carbonaceous material largely used in commercial practice is wood charcoal, a relatively expensive material. Acid sludges constituting waste products of hydrocarbon oil refining processes in which sulphuric acid is used may be decomposed by heating to produce relatively large amounts of sulphur dioxide gas and substantial quantities of solid carbonaceous coke-like residues. It has recently been found that such acid sludge coke, when containing little or no volatile matter, is a particularly active type of carbonaceous material and may also be used to substantial commercial advantage as a source of carbon in the manufacture of carbon bisulphide. On account of the relative scarcity of carbonaceous materials suitable for use in the manufacture of carbon bisulphide, it will be appreciated that such materials demand a premium on the market.

In the past, carbon bisulphide has been commonly produced by reacting sulphur vapor and wood charcoal at high temperatures, e. g. around 1450–1650° F., in externally heated pots or retorts. Such retorts are pear-shaped and small, being generally not more than about 30 inches in diameter. It has been impractical to make the retorts much larger because the high external temperatures required to force the necessary heat to the center of the reaction mass would be prohibitive. The retorts have been made of cast iron and are relatively short-lived on account of the deteriorating effects of the high temperatures externally applied and the corrosive effects of sulphur and carbon bisulphide produced. Furthermore, large numbers of such retorts are required to obtain production of carbon bisulphide in commercial quantities. Consequently, installation and maintenance costs are high, retort replacements constituting a large item of operating costs. Regardless of the form in which sulphur is introduced, whether as sulphur vapor or sulphur dioxide, supply of heat to the reaction is a problem always confronting the operator.

Recognizing the disadvantages encountered in the manufacture of carbon bisulphide in a large number of small retorts, such as just described, it has been proposed to carry out the reaction in larger retorts. In this procedure, oxygen is introduced into the reaction zone along with the sulphurous gas, and the amount of oxygen is controlled so as to support combustion of a sufficient amount of the carbon in the retort to generate heat necessary to maintain the reaction. The principal disadvantages inherent in such prior proposal are (1) consumption in the retort of a large amount of the relatively expensive carbon, e. g. wood charcoal, for purpose other than combination with sulphur, and (2) production of relatively large quantities of carbon oxysulphide, formation of which is substantially promoted by the presence of the oxygen of the air introduced into the system primarily to support combustion of carbon for heat generation. In the manufacture of carbon bisulphide, production of carbon oxysulphide is a troublesome feature and something to be avoided as much as possible on account of sulphur loss as COS and corresponding reduction of $CS_2$ yields.

One of the principal objects of the invention is to provide a process in which the $CS_2$ forming reaction may be carried out in a large retort, and in which process the heat necessary is supplied internally of the retort but is furnished in such a way as to avoid any appreciable consumption, for heat generating purposes, of the expensive carbonaceous material used for carbon bisulphide production. To this end the invention aims to provide a method by which the heat necessary to maintain the endothermic $CS_2$ forming reaction and to offset radiation losses may be supplied by initially burning, e. g. by air-blasting, a relatively cheap form of fuel, e. g. metallurgical coke, in a suitable gas producer or generator. Burning of the cheap fuel is regulated and continued for a time interval sufficient to form a bed of hot coke of size and temperature such that on passage of a stream of sulphurous gas, e. g. sulphur vapor or sulphur dioxide, through the bed the sulphur vapor (introduced as such or formed from sulphur dioxide) is heated to temperatures sufficiently high that on contacting the sulphurous gas with an active solid carbonaceous material, e. g. charcoal, sufficient heat is present to effect formation of carbon bisulphide. For example, such combustion is continued and regulated until there is formed in the producer a deep bed of incandescent coke at temperatures of 1800 to 2500° F. or more. As will hereinafter appear, preferably the CO content of the CO—$N_2$ producer gas formed during the air-blasting cycle in the producer is burned to supply further heat to the $CS_2$ forming reaction. At the end of the air-blasting cycle, air supplied to the producer is shut off and the sulphurous gas, such as sulphur vapor or sulphur dioxide constituting the source of sulphur in the $CS_2$ forming reaction, is passed through the bed of incandescent coke in the producer at a rate preferably such that while passing through the hot coke the sulphur vapor becomes heated to temperatures in excess of the temperature necessary to effect combination of carbon and sulphur to form carbon bisulphide. The highly heated sulphur vapor is then introduced into a reaction chamber containing a body of carbon sufficiently active to combine with sulphur to form carbon bisulphide at the temperatures usually employed in $CS_2$ production. The invention thus makes possible internal supply of heat to the reaction zone by combustion of a cheap form of fuel and without consumption of expensive reactive form of carbon for generating heat, and use of a large cheaply built and maintained reaction retort without consumption of expensive active carbon for purposes of heat generation.

One preferred embodiment of the invention may be carried out in an apparatus unit comprising a pair of similarly constructed and operated gas producers, a recuperator and a carbon bisulphide reaction zone. In this embodiment, the first gas producer is operated on the air-blasting cycle, while the second producer is operated on an incoming sulphurous gas heating cycle. The exit gas (sulphur vapor) of the producer on the sulphurous gas heating cycle preferably is passed through a recuperator in which the CO—$N_2$ gases of the producer on the air-blasting cycle are being burned in indirect heat exchange relation thus further heating up the incoming sulphur vapor which then passes out of the recuperator and enters the $CS_2$ reaction zone at temperatures preferably several hundred degrees above optimum carbon bisulphide formation temperatures. The $CS_2$ reaction zone comprises active solid carbonaceous material, e. g., charcoal, of such depth that even though the sulphur vapor enters the reaction zone at temperatures several hundred degrees above optimum $CS_2$ formation temperatures, there exists in the charcoal bed a zone, which may be located substantially beyond the point of first contact of sulphur vapor and charcoal, and in which zone optimum $CS_2$ formation temperatures prevail. In other words, the sulphur vapor which has been preheated to a temperature above the optimum $CS_2$ formation temperature, on contacting with the charcoal bed is cooled and finally reaches a point at which formation of $CS_2$ takes place under optimum temperature conditions. The incoming sulphur vapor thus stores up heat in the initial portion of the charcoal bed.

As the reaction proceeds the producer which is being used to heat the sulphurous gas cools off and the temperature of the gas (sulphur vapor) entering the $CS_2$ reaction zone drops. The gas then picks up the heat which has been stored in the initial portion of the charcoal bed. The zone of optimum $CS_2$ formation temperature gradually recedes and when it approaches the point of first contact of sulphur vapor and charcoal, the first producer initially on the air-blasting cycle is switched over to incoming sulphurous gas heating cycle, and the second producer initially on sulphurous gas heating cycle is then placed on the air-blasting cycle and the cycle repeated. Hence, in this embodiment of the invention, the $CS_2$ forming reaction is maintained continuous. The exit gas mixture of the reaction zone, containing carbon bisulphide vapor, is treated for recovery of liquid $CS_2$.

Another embodiment of the invention is carried out in an apparatus unit comprising principally a single gas producer and an associated carbon bisulphide reaction chamber. In this modification, the coke bed in the gas producer is air-blasted for a sufficient length of time to produce a coke bed at temperatures 1800° to 2500° F. During the air-blasting cycle, the hot CO—$N_2$ gases formed are passed into and through the body of active carbon in the carbon bisulphide reaction chamber to heat up the active coke to temperatures in the neighborhood of the carbon bisulphide reaction temperature. The CO—$N_2$ gases leaving the reaction chamber are preferably burned with supplemental air, in indirect heat exchange relation with the air fed in the producer to air-blast the coke. When the deep bed of coke in the gas producer becomes sufficiently heated as above described, air-blasting is stopped and sulphurous gas is introduced into the producer and passed through the bed of hot coke therein. The sulphurous gas becomes highly heated and is then passed into the carbon bisulphide reaction zone and contacted with active coke to produce carbon bisulphide. When the $CS_2$ reaction zone becomes cooled down as mentioned in connection with the previously described modification, the supply of sulphurous gas to the producer is shut off and air-blasting is repeated to again raise the temperature of the $CS_2$ reaction zone and coke bed.

The nature of the invention, the details, objects and advantages thereof may be more fully understood from a consideration of the following description taken in connection with the accompanying drawings, in which Fig. 1 illustrates a plant layout of apparatus in which one embodiment of the process of the invention may be carried out;

Fig. 2 is a vertical section of a gas producer;

Fig. 3 is a vertical section of a carbon bisulphide reaction chamber; and

Fig. 4 illustrates, partly in section and partly diagrammatic, a plant layout in which another embodiment of the invention may be carried out.

Referring to Fig. 2 of the drawings, 10 indicates a CO gas producer comprising a steel shell 11 which may be lined with any suitable refractory heat-resistant material. The producer is provided with a grate 12 made of suitable material and arranged to support a relatively large body of carbonaceous material 13 such as metallurgical coke. At the bottom of the producer, beneath grate 12, is an air inlet 15 and an ash clean-out opening 16. Mounted on top is a hopper 19 in which is maintained a supply of coke to be fed into the producer. The hopper may be equipped with a suitable valve 20 constructed to permit introduction of coke into the producer without permitting discharge of gases.

The producer CO—$N_2$ gas outlet main 22 (also shown in Fig. 1) is connected at the opposite end with the CO—$N_2$ gas inlet header 24 of recuperator 26. The recuperator may be of any suitable design and material and is made so that the hot CO producer gas introduced through header 24 may burn in the recuperator in indirect heat exchange relation with a stream of sulphur vapor constituting the source of sulphur in the subsequent $CS_2$ forming reaction. The CO producer gas, after having been burned in the recuperator flows through a pipe 27, through heat exchanger 28, through heat exchanger 29, and thence to the plant stack.

Producer 10 (Fig. 2) is also provided with a sulphurous gas inlet 30 and the hot sulphurous gas outlet 31. As shown in Fig. 2, inlet 30 and outlet 31 are preferably located so as to permit introduction and withdrawal of sulphurous gas into and from the hottest zone in the producer. Outlet 31, as shown in Fig. 1, is connected to an inlet header 34 which introduces the hot sulphurous gas into recuperator 26. Producer 33 (Fig. 1) is constructed the same as producer 10 and is provided with corresponding air and sulphurous gas inlets and $CO$—$N_2$ and sulphurous gas outlets as producer 10.

The construction of $CS_2$ reaction chamber 36 (Fig. 3) may duplicate that of producer 10. Supported on grate 40 of the reaction chamber is a body 41 of active type of carbon such as charcoal, supply of which to the reaction chamber is maintained by a hopper 43 and feed valve 44. Sulphurous gases, constituting the source of sulphur of the carbon bisulphide forming reaction, after passage through recuperator 26 are fed through pipe 46 into reaction chamber 36, Figs. 1 and 3. The $CS_2$ reaction chamber is connected by pipe 48 with a waste heat boiler 49.

In the practice of that embodiment of the invention carried out in the apparatus shown in Figs. 1, 2, and 3, producer 10 is substantially filled with relatively low-priced solid carbonaceous material, such as metallurgical coke. It is preferred to employ carbonaceous material containing little or no hydrocarbons since presence of hydrogen in the coke might give rise to presence of hydrogen in the subsequent $CS_2$ reaction with attendant production of $H_2S$. In starting operations by adjustment of the associated valves producer 33 is shut out of the system, and valve 55 (Fig. 1) in sulphurous gas inlet pipe 30 and valve 56 in sulphurous gas outlet pipe 31 of producer 10 are closed, and valve 58 in air inlet pipe 15 and valve 59 in $CO$—$N_2$ gas outlet pipe 22 are opened. After initial ignition of coke in producer 10, the quantity of air (preheated several hundred degrees by passage through heat exchanger 29) admitted into the producer 10 through valve 58 and the depth of the bed of coke are regulated so that coke is burned so as to produce preferably a hot gas mixture comprising chiefly CO and nitrogen. Generally speaking, the producer is operated in substantially the same way as the well-known gas producers, except that it is desirable to avoid the presence of water or steam. Air-blasting of the deep bed of coke is continued until there is formed a large bed of coke at temperatures such that on passage of a stream of sulphurous gas through the bed such gas is heated to temperatures sufficiently high that on contacting the sulphurous gas with active carbon sufficient heat is present to effect formation of $CS_2$. Preferably air-blasting is continued until there is obtained in the producer a deep bed of incandescent coke heated to temperatures upwards of 1800 to 2500° F. The hot $CO$—$N_2$ gas formed in the producer flows through pipe 22 and header 24 into recuperator 26. By suitable adjustment of valve 60 in air line 61, a sufficient amount of preheated supplemental air is introduced to support combustion of the CO in the recuperator which thus becomes heated up to temperatures around say 2000° F. The burned CO gas then flows through heat exchangers 28 and 29. From time to time, during operations the supply of coke to the producer may be replenished as needed by operation of valve 20 and ash is withdrawn through opening 16.

When the desired high temperature is obtained in the coke bed in producer 10, this unit is taken off the air-blasting cycle by closing valves 58 and 59, and producer 33 is placed on the air-blasting cycle by opening valves 65 and 66. Producer 33 is then air blasted and the $CO$—$N_2$ gas formed is burned in recuperator 26 as already described in connection with producer 10. Producer 10 is now ready to be placed on the sulphurous gas heating cycle.

In the preferred form of the invention, sulphur vapor obtained by volatilization of brimstone is used as a source of sulphur. This sulphur vapor may be readily obtained in a condition substantially free of oxygen. A stream of sulphur vapor may be generated in any suitable vaporizer or sublimer 70. Such vapor may be introduced into inlet pipe 75 in any suitable way. For example, tail gases from absorber 85 may be drawn by a fan and passed through the sublimer 70, such tail gases in this way acting to carry the sulphur vapor into the system. When using sulphur vapor, the invention affords a particularly efficient process since substantial absence of hydrogen and free oxygen in the system minimizes production of COS and $H_2S$ in reaction chamber 36.

While it is preferred to employ sulphur vapor as a source of sulphur, the principles of the invention may be also applied, though to less desirable advantage, to utilization of sulphur dioxide gas as a source of sulphur. If sulphur dioxide is employed, it is preferred to use a highly concentrated sulphur dioxide gas containing as little free oxygen and/or moisture as feasible. A suitable source of sulphur as sulphur dioxide gas is acid sludge formed in the sulphuric acid purification of hydrocarbon oils. Acid sludges may be destructively decomposed in the substantial absence of air by external heating in a suitable retort. The exit gas mixture of such retort comprises principally sulphur dioxide and water vapor, and smaller amounts of carbon dioxide and hydrocarbon vapors. This gas mixture may be cooled sufficiently, say to 100° F. or room temperature, to condense out most of the water and hydrocarbons. The resultant gas may have a sulphur dioxide concentration of 85 to roughly 100%. If desired, the $SO_2$ of the sludge gas may be absorbed in a suitable absorbent and separated from the absorbent by heating, in which case a substantially pure $SO_2$ gas is obtained. When $SO_2$ gases of the kind described or any other suitable $SO_2$ gases are employed as a source of sulphur, such gases should be dried before introducing the same into the system through pipe 72. When $SO_2$ gas is employed it may be desired to preheat the same before introduction into the producers. By utilization of the burned CO gases from recuperator 26, incoming $SO_2$ gases may be preheated in exchanger 28 to temperatures of the order of 1000° F.

Reaction chamber 36 is substantially filled with a body of solid carbonaceous material of a type sufficiently active for use in the manufacture of carbon bisulphide. Wood charcoal is a suitable material. Another sufficiently active type of carbonaceous material is acid sludge coke constituting the solid carbonaceous residue remaining in the retort after destructive decomposition of acid sludge as described above in connection with production of acid sludge $SO_2$ gas. Acid sludge coke resulting from low temperature destructive decomposition of acid sludges usually contains a large amount, for example 30-40% of volatile matter, comprising chiefly hydrocarbons. This volatile matter may be driven off by heating at relatively high temperatures, e. g. 1200-1600° F., for a substantial period of time, say from 2 to 6 hours. Acid sludge coke if employed in the present process should contain preferably substantially no and in any event not more than about 3% volatile matter.

When starting operation, the body of active carbon in chamber 36 may be brought up to temperatures approximating carbon bisulphide forming reaction temperature by heating the carbon body in any suitable way. For example, hot $CO$—$N_2$ gas from one of the producers may be by-passed by means of suitable pipe connections through reaction chamber 36 and flow of such gas maintained for a sufficient period of time to heat the coke body 41 up to temperatures of say 1500° F. The active coke in chamber 36 is now at temperatures sufficiently high to permit introduction of sulphurous gases constituting the source of sulphur; producer 33 is on the air-blasting cycle, the CO gas formed being burned in recuperator 26; and producer 10 has just been taken off the air-blasting cycle, leaving a body of coke therein heated to temperatures of 1800 to 2500° F.

Assuming that sulphur vapor is being employed as the source of sulphur, such vapor is run into the system through conduit 75 into sulphur vapor inlet pipe 30 of producer 10. The hot sulphur vapor is preferably introduced into the bed of hot coke in producer 10 at a point somewhat above the grate 12 at about the lower extremity of the hot zone (indicated in Fig. 2 as being between the horizontal dotted lines) in the deep coke bed in the producer 10. The sulphur vapor is flowed upwardly through the hot coke bed at a rate controlled so that the vapor becomes highly heated to temperatures several hundred degrees in excess of that necessary to effect combination of sulphur and carbon to form carbon bisulphide. For example, sulphur may be withdrawn from producer 10 at approximately the upper extremity of the hot zone at temperatures of around 2000° F. or higher especially at the beginning of the sulphur vapor heating cycle. The highly heated sulphur vapor then flows through pipes 31 and 34 into recuperator 26 through which the sulphur vapor passes while in indirect heat exchange relation with the burning $CO$—$N_2$ gas fed into the recuperator through pipe 24 from producer 33. The temperature of the sulphur vapor leaving producer 10 through pipe 31 is highest at the beginning of the sulphur vapor heating cycle, at which time as indicated the sulphur vapor may be at temperatures of the order of 2000° F. and upward. When the sulphur vapor is of such high temperature, transfer of heat from burning CO gas in recuperator 26 to sulphur vapor flowing through the recuperator is at a minimum, and hence at the outset the increase of temperature of the sulphur vapor while passing through the recuperator may be small, possibly of the order of 100-200° F. However, as the sulphur vapor heating cycle in producer 10 continues, the temperature of the sulphur vapor leaving the producer gradually decreases and the amount of heat transfer from the burning CO gas in recuperator 26 becomes of substantial importance. Under favorable operating conditions, by burning the CO producer gas in recuperator 26 the temperature of the sulphur vapor leaving the recuperator through pipe 46 may be maintained for the major period of time in excess of say 1800-2000° F. In any case, it will be understood that the apparatus units ahead of the carbon bisulphide reduction zone are operated at all times so as to provide for introduction into the reaction zone of sulphur vapor containing sufficient heat to effect combination of sulphur and carbon in the reaction zone and to offset radiation losses.

At the beginning of the sulphur vapor heating cycle in producer 10, the temperature of the sulphur vapor introduced into the reaction zone 36 is at a maximum, e. g. of the order of 2000° F. or above, and is hence considerably in excess of the optimum temperatures for carbon bisulphide production. The sulphur vapor entering the top of reaction chamber 36 at initial maximum temperature first imparts substantial quantities of heat to the upper layers of carbon and on continued downward passage gradually becomes cooled to the temperature range at which best yield of carbon bisulphide may be obtained. Indications are that most satisfactory production of carbon bisulphide is obtained at temperatures generally of the order of 1460-1560° F. A deep bed of active carbon is maintained in reaction chamber 36 for the purpose of providing a reservoir for substantial quantities of heat. The depth of the bed of carbon in chamber 36 is maintained such that no matter how high may be the temperatures of the sulphurous gas at the point of first contact with carbon, the bed is of sufficient depth so that some place below the top of the bed there exists a zone of substantial size in which optimum $CS_2$ production temperatures prevail. As the reaction proceeds, the temperature of the incoming sulphur vapor decreases and the sulphur vapor begins to reabsorb heat from the upper layers of hot carbon in the reaction chamber. Hence, as the sulphur vapor heating cycle of producer 10 progresses, the zone of optimum reaction temperature in the coke in reaction chamber 36 rises and approaches the top of the bed. Temperatures in different parts of the carbon bed in the reaction chamber may be determined by suitable means, and when the temperature in the upper layers of the coke decreases to say 1500° F., producer 10 is taken off the sulphur vapor heating cycle and put on the air-blasting cycle, while producer 33 is simultaneously taken off the air-blasting cycle and put on the sulphur vapor heating cycle. The sulphur vapor heating cycle is carried out in producer 33 the same way as in producer 10 and the sulphur vapor is fed into recuperator 26 through pipes 77 and 34. The $CO$—$N_2$ gas formed in producer 10, now on the air-blasting cycle, is burned in recuperator 26, and the carbon bisulphide forming reaction proceeds in reaction chamber 36 as previously described.

The reaction gas mixture leaving chamber 36 comprises $CS_2$ vapor with an appreciable amount of COS, and possibly small quantities of CO and $CO_2$. The gases leaving the reaction chamber are carried by pipe 48 to a waste heat boiler 49 where the gas temperature is reduced to about 1100° F. at which temperature the gases pass into gas cooler 80. The CS₂ gases after leaving cooler 80 are carried through oil preheater 82, cooled to about 300° F., and are desirably passed through another cooler 83 in which the gas temperature is reduced to about 100° F.

It has been found that straw oil constitutes a very suitable material for absorbing CS₂ and whatever COS may be contained in the furnace gases. Accordingly, exit gases of cooler 83 are passed into the bottom of a CS₂ and COS absorbing tower 85 over which absorbent straw oil is circulated. A supply of straw oil is maintained in tank 86 by circulating pump 88. Rate of downflow of oil through tower 85 is controlled by valve 89 so as to effect absorption of substantially all of the CS₂ and COS contained in the upwardly flowing furnace gases. The proper rate of flow of oil through tower 85 may be readily determined to suit any particular set of operating conditions. In this way substantially all of the CS₂ and COS of the gas stream become absorbed in the oil and are thus separated from most of the remaining furnace gases which are discharged from tower 85 into the plant stack.

The effluent oil in tower 85, containing absorbed CS₂ and COS, runs through line 90, preheater 82 and line 91, into CS₂ and COS stripping still 93. This stripper comprises a tower or column provided with means in the bottom for introduction of live steam and with any suitable refluxing arrangement in the upper part. Oil rich in absorbed CS₂ and COS is fed into the top of the stripper and steam, at temperatures of about 101° C. from boiler 49 and line 94 is introduced into the bottom of the stripper. Stripped oil runs from the bottom of tower 93 into a suitable separator 96 in which oil and condensed water are separated, and the separated oil, after cooling to about 100° F. in cooler 97, is returned by pump 88 to oil tank 86.

Steam, CS₂ vapor and COS gas discharged from the top of the stripper 93, flow through line 99 and through two water-cooled condensers 101 and 102 connected in series. These coolers are operated so as to liquefy substantially all of the water and CS₂ vapor which together with the COS gas collect in a receiver or separator 104. If desired, condensers 101 and 102 may be refrigerated to effect maximum condensation of H₂O and CS₂. In receiver 104, water and CS₂ are separated, the water being discharged to waste, and the CS₂ run into storage tank 106. Whatever COS may be discharged from separator 104 may be treated for recovery of sulphur or disposed of in any way not creating a nuisance.

Activated carbon, for example "Norite" is also a satisfactory absorbent for both CS₂ and COS. If it is desired to use this material, the absorbed CS₂ and COS may be released by heating to say 105° C.

When SO₂ gas is used as a source of sulphur, the general procedure is the same as when using sulphur vapor. However, during the SO₂ gas heating cyle is a producer, substantially all of the SO₂ is reduced to elemental sulphur and carbon monoxide. In this way, the invention provides the substantial operating advantage that the carbon used to reduce SO₂ to sulphur is a cheap form of carbon (e. g. metallurgical coke) and not the expensive active carbon used in the subsequent CS₂ reaction chamber. Hence, none of the expensive active carbon is used to combine with the oxygen brought into the system as SO₂. Although the metallurgical coke is insufficiently active to effect any appreciable commercial production, some CS₂ may be formed. However, all reducible compounds, such as SO₂ and CO₂, which may be present in the incoming gas are reduced, thus avoiding consumption for this purpose of expensive active carbon in reaction chamber 36. Use of SO₂ as a source of sulphur has the disadvantage that greater quantities of COS are formed on account of the presence of oxygen introduced as SO₂. However, the COS formed is separated from the reaction gases in the absorber 85 as described, and sulphur of the COS may be recovered by treatment of the COS discharged from separator 104.

In that embodiment of the invention described in connection with Figs. 1-3, production of carbon bisulphide is continuous and the apparatus employed includes a pair of producers. In the modification which may be carried out in the apparatus illustrated in Fig. 4, while carbon bisulphide production is not continuous, a single producer and associated reaction chamber may be used. Referring to Fig. 4, producer 110 and the carbon bisulphide reaction chamber 111 may be constructed the same as producer 10 of Fig. 2 and reaction chamber 36 of Fig. 3. Producer 110 and reaction chamber 111 are in direct communication at their upper ends by means of a gas main 113. In practice producer 110 is charged with metallurgical coke as in the case of producer 10, reaction chamber 111 is filled with an active type of carbon the same as is reaction chamber 36. When starting operations in the apparatus of Fig. 4, air is drawn into the system by blower 115, passed through heat exchanger 126, pipe 116 having a control valve 117, and thence into the bottom of producer 110 which is air-blasted in the same way as producer 10. However, while blasting producer 110, care should be taken so as to form a CO—N₂ gas containing as little CO₂ as practicable so as to avoid possible consumption of expensive active carbon in reducing such CO₂ to CO when the producer gas is subsequently passed through the reaction chamber 111.

The hot gas leaving the producer 110 at temperatures of say 1800-2200° F. flows through connection 113 and thence downwardly through the deep bed 120 of active coke in chamber 111. Valve 122 is closed and valve 123 is opened so that the CO—N₂ gas discharged from the bottom of chamber 111 flows through pipe 125 into recuperator 126 in which the CO content of the gas is burned with secondary air introduced through valve controlled pipe 130. Heat generated by combustion of the CO gas is transferred to the incoming air so as to preheat the latter to relatively high temperatures, e. g. of the order of 1000° F. During passage of the hot CO—N₂ gas downwardly through active coke 120 the latter becomes heated by heat absorption from the producer gas. Air-blasting of producer 110 and passage of the CO—N₂ gas formed through coke bed 120 is continued until the temperature of the coke bed in producer 110 is around 2500° F., as in the case of producers 10 and 33 of Fig. 1. By this time, the active coke 120 in chamber 111 has become heated up to temperatures of the order of say 1500° F. or upward. Air-blasting of producer 110 is then discontinued by closing valve 117 and valve 123 in pipe 125. Valve 122 in CS₂ main 133 is then opened.

Sulphur vapor or SO₂ gas may be used as a source of sulphur as in the modification of the invention carried out in the apparatus of Figs. 1-3. The sulphurous gas employed may be preheated if desired, for example by passage through a regenerator through which burned CO gas discharged from recuperator 126 is passed during the air-blasting cycle. Valve 135 in producer inlet pipe 136 is then opened and sulphurous gas is introduced into the lower extremity of the hot zone of incandescent coke. The sulphurous gas during upward passage through the incandescent coke becomes heated to temperatures of say 2000° F. or more, and then flows through connection 113 into contact with the active coke 120 in reaction chamber 111. The operation of reaction chamber 111 and the formation of carbon bisulphide therein is then the same as has been described in connection with reaction chamber 36 of Figs. 1 and 3. The carbon bisulphide reaction gas mixture then passes through pipe 133 to a $CS_2$ recovery system which may be the same as the apparatus units shown in Fig. 1 subsequent to the reaction chamber 36.

When the temperature in the upper part of the active coke bed in chamber 111 drops to around 1500° F., valve 135 of inlet pipe 136 and valve 122 in $CS_2$ outlet pipe 133 are closed thus taking the apparatus off the $CS_2$ production cycle, and valve 117 in air line 116 and valve 123 in CO gas pipe 125 are opened, and air-blasting is repeated to reheat the coke in producer 110 and the active coke in reaction chamber 111 and again bring the system up to temperatures high enough to maintain a subsequent production cycle.

In the modification described in connection with Figs. 1–3, a pair of producers is employed. This modification may be put upon an intermittent $CS_2$ production basis by omitting one producer. In this situation, the CO—$N_2$ gas formed during the air-blasting cycle may be temporarily stored in a gas holder and then burned in a recuperator, such as 26, during the subsequent $CS_2$ production cycle.

In the appended claims the expression "sulphurous gas" is used to include sulphur vapor or sulphur dioxide or a mixture of these. The terms "active carbon" and "active carbonaceous material" are intended to define a carbon of the type of wood charcoal or acid sludge coke, which is sufficiently active to combine with sulphur to form carbon bisulphide.

I claim:

1. The method of making carbon bisulphide which comprises introducing into a reaction zone solid inactive carbonaceous material, burning said material to form a hot body of said material, passing sulphur vapor in contact with said hot body to impart to the sulphur vapor heat of the body, introducing into a second reaction zone solid active carbonaceous material, and then passing the preheated sulphur vapor into contact with said solid active carbonaceous material to effect combination of sulphur and carbon to form carbon bisulphide, whereby heat generated by combustion of said inactive carbonaceous material is utilized in forming carbon bisulphide.

2. The method for making carbon bisulphide which comprises introducing into a reaction zone solid inactive carbonaceous material, burning said material to form a hot body of said material, passing sulphurous gas of the class consisting of sulphur vapor and sulphur dioxide in contact with said hot body to impart to the gas heat of the body, introducing into a second reaction zone solid active carbonaceous material, and then passing the preheated sulphurous gas into contact with said solid active carbonaceous material to effect combination of sulphur and carbon to form carbon bisulphide, whereby heat generated by combustion of said inactive carbonaceous material is utilized in forming carbon bisulphide.

3. The method for making carbon bisulphide which comprises introducing into a reaction zone solid inactive carbonaceous material, burning said material to form a hot body of said material, regulating and continuing combustion of said material for a time interval sufficient to form a relatively deep body of incandescent solid inactive carbonaceous material heated to temperatures several hundred degrees in excess of optimum temperatures for effecting combination of sulphur and active carbon to form carbon bisulphide, discontinuing such combustion operation, passing through said body a stream of sulphurous gas of the class consisting of sulphur vapor and sulphur dioxide at a rate such as to heat the gas to temperatures substantially in excess of optimum carbon bisulphide formation temperatures, introducing into a second reaction zone solid active carbonaceous material, contacting the preheated sulphurous gas with a body of said solid active carbonaceous material of substantial depth, and recovering carbon bisulphide.

4. The method for making carbon bisulphide which comprises introducing into a reaction zone solid inactive carbonaceous material, burning said material to form an initial hot body of said material, regulating and continuing combustion of said material for a time interval sufficient to form a relatively deep body of incandescent material heated to temperatures several hundred degrees in excess of optimum temperatures for effecting combination of sulphur and active carbon to form carbon bisulphide, discontinuing such combustion operation, passing through said hot body of material a stream of sulphurous gas of the class consisting of sulphur vapor and sulphur dioxide at a rate such as to heat the gas to temperatures substantially in excess of optimum carbon bisulphide formation temperatures, introducing into a second reaction zone solid active carbonaceous material, contacting the preheated gas with a body of said active material of sufficient depth that in a zone of substantial size optimum temperatures for formation of carbon bisulphide prevail, continuing passage of sulphurous gas through said initial body and through said active carbonaceous material until there is a substantial drop in temperature in the zone of first contact of sulphurous gas and active carbonaceous material, thereafter contacting with said active material a further supply of sulphurous gas heated to temperatures substantialy in excess of optimum carbon bisulphide formation temperatures, and recovering carbon bisulphide.

5. The method for making carbon bisulphide which comprises introducing into a reaction zone solid inactive carbonaceous material, burning said material to form carbon monoxide gas and an initial hot body of solid material, regulating and continuing combustion of said material for a time interval sufficient to form a body of hot material of size and temperature such that on passage of a stream of sulphurous gas of the class consisting of sulphur vapor and sulphur dioxide through the body such gas is heated to temperature sufficiently high that on contacting said gas with an active solid carbonaceous material sufficient heat is present to effect formation of carbon bisulphide, discontinuing such combustion operation, and then passing through said initial body a stream of said sulphurous gas to heat the same, then burning carbon monoxide gas in indirect heat exchange relation with the preheated stream of sulphurous gas, introducing into a second reaction zone solid active carbonaceous material, contacting said heated sulphurous gas with said active material to effect combination of sulphur and carbon to form carbon bisulphide, and recovering carbon bisulphide.

6. The method for making carbon bisulphide which comprises introducing into a reaction zone solid inactive carbonaceous material, burning said material to form hot carbon monoxide gas and an initial hot body of said material, regulating and continuing combustion of said material for a time interval sufficient to form a body of hot material of size and temperature such that on passage of a stream of sulphurous gas of the class consisting of sulphur vapor and sulphur dioxide through the body such gas is heated to temperatures sufficiently high that on contacting said gas with an active solid carbonaceous material sufficient heat is present to effect formation of carbon bisulphide, introducing into a second reaction zone solid active carbonaceous material, passing said hot carbon monoxide gas during said time interval through a body of said active material to heat the same to temperatures approaching carbon bisulphide formation temperature, discontinuing such combustion operation, passing through said initial body a stream of said sulphurous gas to heat the same, contacting the preheated gas with said body of active solid carbonaceous material to effect combination of sulphur and carbon to form carbon bisulphide, and recovering carbon bisulphide.

7. The method for making carbon bisulphide which comprises introducing into a reaction zone solid inactive carbonaceous material, burning said material to form hot carbon monoxide gas and an initial hot body of said material, regulating and continuing combustion of said material for a time interval sufficient to form a relatively deep body of incandescent solid material heated to temperatures several hundred degrees in excess of optimum temperatures for effecting combination of sulphur and active carbon to form carbon bisulphide, introducing into a second zone solid active carbonaceous material, passing said hot carbon monoxide gas during said time interval through a body of said active material to heat the same to temperatures approaching carbon bisulphide formation temperature, discontinuing such combustion operation, passing through said initial hot body a stream of sulphurous gas of the class consisting of sulphur vapor and sulphur dioxide at a rate such as to heat the gas to temperatures substantially in excess of optimum carbon bisulphide formation temperature, contacting the preheated gas with said active solid carbonaceous material, and recovering carbon bisulphide.

8. The method for making carbon bisulphide which comprises burning in a reaction zone solid inactive carbonaceous material to form a heated body of said material, passing a stream of sulphurous gas of the class consisting of sulphur vapor and sulphur dioxide in contact with said heated body thus preheating said gas by the heat stored in said body, and then passing the preheated gas in contact with a body of solid active carbonaceous material in a second reaction zone to effect combination of sulphur and carbon to form carbon bisulphide.

9. The method for making carbon bisulphide which comprises burning the first of a pair of bodies of solid carbonaceous material to form a first bed of hot solid carbonaceous material, regulating and continuing combustion of the first body of solid carbonaceous material for a time interval sufficient to form a first bed of hot solid carbonaceous material of size and temperature such that on passage of a stream of sulphurous gas of the class consisting of sulphur vapor and sulphur dioxide through the first bed said gas is heated to temperatures sufficiently high that on contacting said sulphurous gas with an active solid carbonaceous material sufficient heat is present to effect formation of carbon bisulphide, discontinuing combustion of said first body of carbonaceous material, passing through said first bed of hot carbonaceous material a stream of said sulphurous gas to heat the same while simultaneously burning and similarly regulating combustion of a second body of solid carbonaceous material to form a stream of hot carbon monoxide gas and a second bed of hot solid carbonaceous material, burning said carbon monoxide gas in indirect heat exchange relation with said heated sulphurous gas, contacting the thus heated sulphurous gas with a body of active solid carbonaceous material to effect combination of sulphur and carbon to form carbon bisulphide, and recovering carbon bisulphide.

10. The method for making carbon bisulphide which comprises burning the first of a pair of bodies of solid carbonaceous material to form a first initial bed of hot solid carbonaceous material, regulating and continuing combustion of said solid carbonaceous material for a time interval sufficient to form a relatively deep first bed of incandescent solid carbonaceous material heated to temperatures several hundred degrees in excess of optimum temperatures for effecting combination of sulphur and active carbon to form carbon bisulphide, discontinuing such combustion operation, passing through said initial bed of hot solid carbonaceous material a stream of sulphurous gas of the class consisting of sulphur vapor and sulphur dioxide at a rate such as to heat the same to temperatures substantially in excess of optimum carbon bisulphide formation temperature while simultaneously burning and similarly regulating combustion of a second body of solid carbonaceous material to form a stream of hot carbon monoxide gas and a second bed of hot solid carbonaceous material, burning said carbon monoxide gas in indirect heat exchange relation with said heated sulphurous gas, contacting the thus heated sulphurous gas with a body of active solid carbonaceous material of sufficient depth that in a zone of substantial size optimum temperatures for formation of carbon bisulphide prevail, and recovering carbon bisulphide.

11. The method for making carbon bisulphide which comprises burning the first of a pair of bodies of solid carbonaceous material to form a first bed of hot solid carbonaceous material, regulating and continuing combustion of the first body of carbonaceous material for a time interval sufficient to form a relatively deep first bed of incandescent carbonaceous material heated to temperatures several hundred degrees in excess of optimum temperatures for effecting combination of sulphur and active carbon to form carbon bisulphide, discontinuing combustion of said first body of carbonaceous material, passing through said first bed of hot carbonaceous material a stream of sulphurous gas of the class consisting of sulphur vapor and sulphur dioxide at a rate such as to heat the same to temperatures substantially in excess of optimum carbon bisulphide formation temperatures while simultaneously burning and similarly regulating combustion of a second body of solid carbonaceous material to form a second bed of hot carbonaceous material, contacting the thus heated sulphurous gas with a relatively deep body of active solid carbonaceous material until the temperature of said active carbonaceous material in the zone of first contact with the hot sulphurous gas drops to approximately optimum carbon bisulphide formation temperatures, to thereby effect combination of sulphur and carbon to form carbon bisulphide, discontinuing combustion of said second body of carbonaceous material, passing said stream of sulphurous gas through said second bed of hot carbonaceous material and thence into contact with said active carbonaceous material, and recovering carbon bisulphide formed during such operations.

CHARLES FORBES SILSBY.